United States Patent
Chan et al.

(10) Patent No.: US 10,146,222 B2
(45) Date of Patent: Dec. 4, 2018

(54) DRIVER TRAINING IN AN AUTONOMOUS VEHICLE

(71) Applicant: Elwha LLC, Bellevue, WA (US)

(72) Inventors: Alistair K. Chan, Bainbridge Island, WA (US); Jesse R. Cheatham, III, Seattle, WA (US); Hon Wah Chin, Palo Alto, CA (US); William David Duncan, Sammamish, WA (US); Roderick A. Hyde, Redmond, WA (US); David B. Tuckerman, Lafayette, CA (US); Thomas Allan Weaver, San Mateo, CA (US)

(73) Assignee: Elwha LLC

( * ) Notice: Subject to any disclaimer, the term of this patent is extended or adjusted under 35 U.S.C. 154(b) by 0 days.

(21) Appl. No.: 15/208,043

(22) Filed: Jul. 12, 2016

(65) Prior Publication Data
US 2018/0018895 A1   Jan. 18, 2018

(51) Int. Cl.
G05D 1/02 (2006.01)
G09B 9/04 (2006.01)
(Continued)

(52) U.S. Cl.
CPC ......... *G05D 1/0061* (2013.01); *B60W 50/087* (2013.01); *G05D 1/0055* (2013.01);
(Continued)

(58) Field of Classification Search
CPC .. G05D 1/0055; G05D 1/0061; G05D 1/0088; G09B 9/04; G09B 9/042;
(Continued)

(56) References Cited

U.S. PATENT DOCUMENTS 8,078,349 B1   12/2011   Prada Gomez et al.
8,353,373 B2   1/2013   Rudakevych
(Continued)

FOREIGN PATENT DOCUMENTS

EP   511494 A2 * 11/1992
JP   2005250564 A * 9/2005 ............ B60W 50/12
JP   2015110417 A * 6/2015

OTHER PUBLICATIONS

Dennis, Wm. Cullen, "Compromise—the great defect of arbitration", Columbia Law Review, vol. 11 No. 6, Jun. 1911, pp. 493 to 513 (Year: 1911).*
(Continued)

*Primary Examiner* — Behrang Badii
*Assistant Examiner* — David A Testardi

(57) ABSTRACT

Described embodiments include a self-propelled vehicle, method, and system. The self-propelled vehicle includes an autonomous driving system configured to dynamically determine maneuvers operating the vehicle along a route in an automated mode without continuous input from a human driver. The vehicle includes an input device configured to receive a real-time request for a specific dynamic maneuver by the vehicle operating along the route from the human driver. The vehicle includes a decision circuit configured to select a real-time dynamic maneuver by arbitrating between (i) the received real-time request for the specific dynamic maneuver from the human driver and (ii) a real-time determination relative to the specific dynamic maneuver received from the autonomous driving system. The vehicle includes an implementation circuit configured to output the selected real-time dynamic maneuver to an operations system of the vehicle.

24 Claims, 5 Drawing Sheets

(51) Int. Cl.
  *G05D 1/00* (2006.01)
  *G09B 9/042* (2006.01)
  *B60W 50/08* (2012.01)
(52) U.S. Cl.
  CPC ............ *G05D 1/0088* (2013.01); *G05D 1/021* (2013.01); *G09B 9/042* (2013.01)
(58) Field of Classification Search
  CPC .......... G09B 9/052; B60Q 1/50; B60Q 1/503; B60W 50/087
  See application file for complete search history.

(56) References Cited

U.S. PATENT DOCUMENTS

| | | | |
|---|---|---|---|
| 8,398,405 B2* | 3/2013 | Kumar | B61C 17/12 434/65 |
| 9,129,460 B2 | 9/2015 | McClellan et al. | |
| 9,196,164 B1 | 11/2015 | Urmson et al. | |
| 9,280,710 B1 | 3/2016 | Ferguson et al. | |
| 9,290,181 B1 | 3/2016 | Dolgov et al. | |
| 9,381,916 B1* | 7/2016 | Zhu | B60W 30/0956 |
| 9,581,460 B1* | 2/2017 | McNew | G01C 21/3667 |
| 2009/0319095 A1 | 12/2009 | Cech et al. | |
| 2012/0083960 A1* | 4/2012 | Zhu | G05D 1/0055 701/23 |
| 2014/0244096 A1* | 8/2014 | An | G05D 1/0055 701/25 |
| 2015/0004573 A1* | 1/2015 | Bomer | G09B 9/04 434/219 |
| 2015/0088358 A1* | 3/2015 | Yopp | B60W 10/04 701/23 |
| 2015/0149021 A1* | 5/2015 | Duncan | A61B 5/18 701/23 |
| 2015/0175168 A1* | 6/2015 | Hoye | B60W 40/09 434/64 |
| 2015/0269860 A1 | 9/2015 | Shaw et al. | |
| 2015/0284010 A1* | 10/2015 | Beardsley | B60W 50/10 701/41 |
| 2015/0314780 A1* | 11/2015 | Stenneth | B60W 30/00 701/23 |
| 2015/0346724 A1* | 12/2015 | Jones | B60W 30/12 701/23 |
| 2016/0176440 A1* | 6/2016 | Witte | G05D 1/0088 701/23 |
| 2016/0252903 A1* | 9/2016 | Prokhorov | B60W 30/143 701/23 |
| 2017/0021837 A1* | 1/2017 | Ebina | B60K 28/06 |
| 2017/0106876 A1* | 4/2017 | Gordon | B60W 50/082 |
| 2017/0166222 A1* | 6/2017 | James | B60W 50/14 |
| 2017/0227959 A1* | 8/2017 | Lauffer | B60W 50/0098 |
| 2017/0248954 A1* | 8/2017 | Tomatsu | G05D 1/0061 |

OTHER PUBLICATIONS

NHTSA, "Preliminary statement of policy concerning automated vehicles", 2013, 14 pages (Year: 2013).*
SAE Int'l., Automated Driving, 2014, 2 pages (Year: 2014).*
Wikipedia article, "Autonomous car", Old revision dated Jul. 11, 2016, 10 pages (Year: 2016).*
"Automated Driving"; SAE International; printed on Jul. 12, 2016; pp. 1-2; located at www.sae.org/autodrive.

* cited by examiner

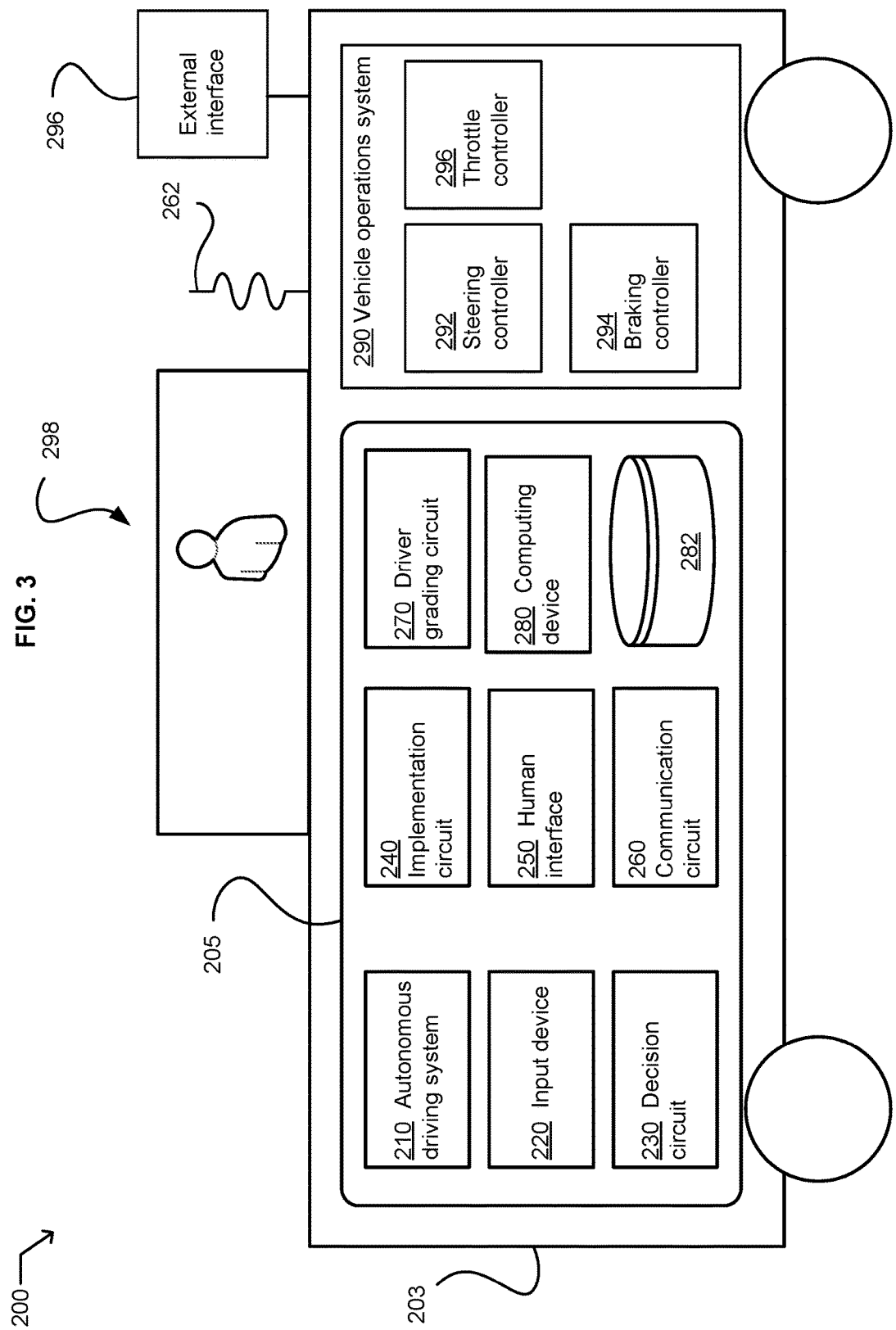

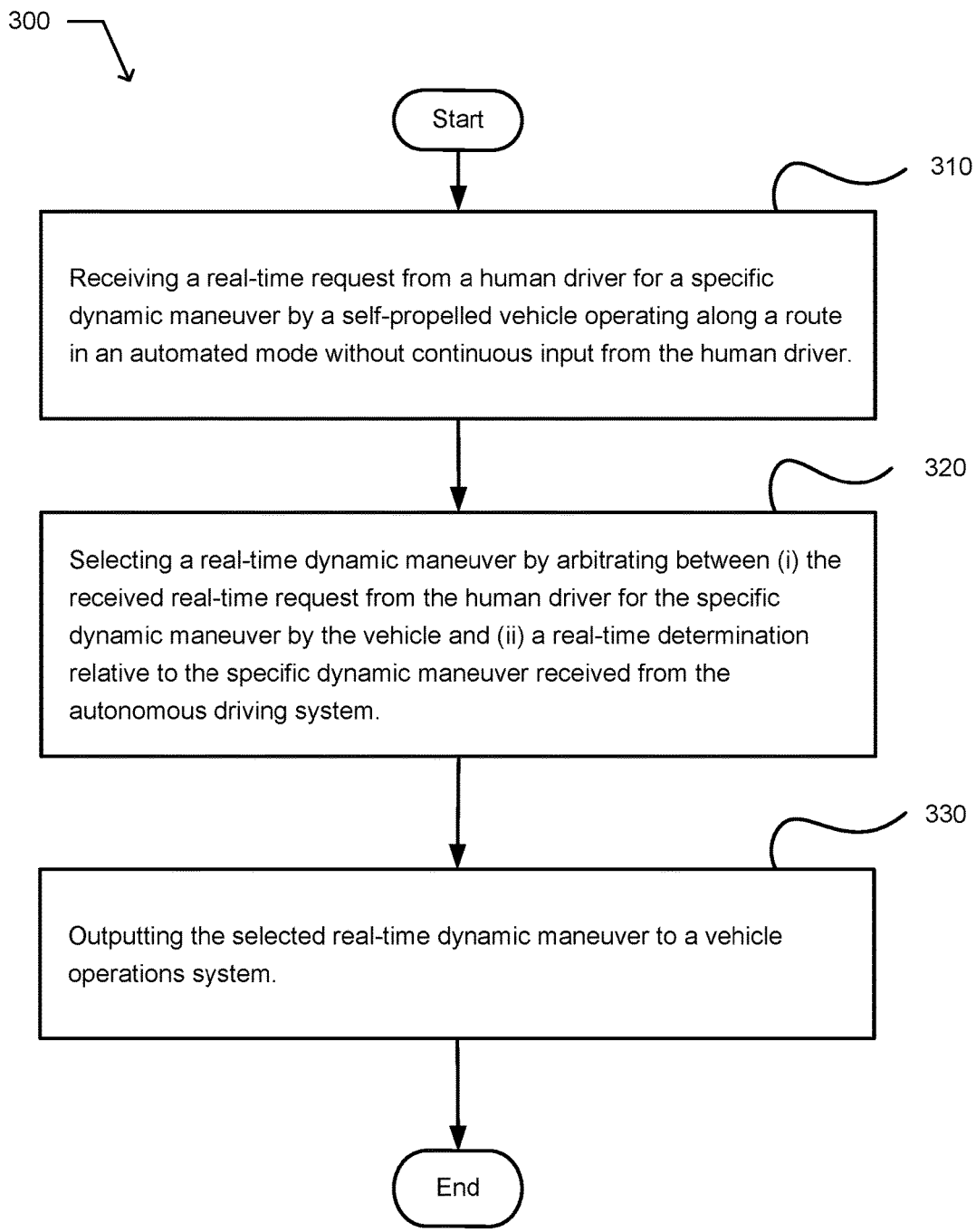

FIG. 5

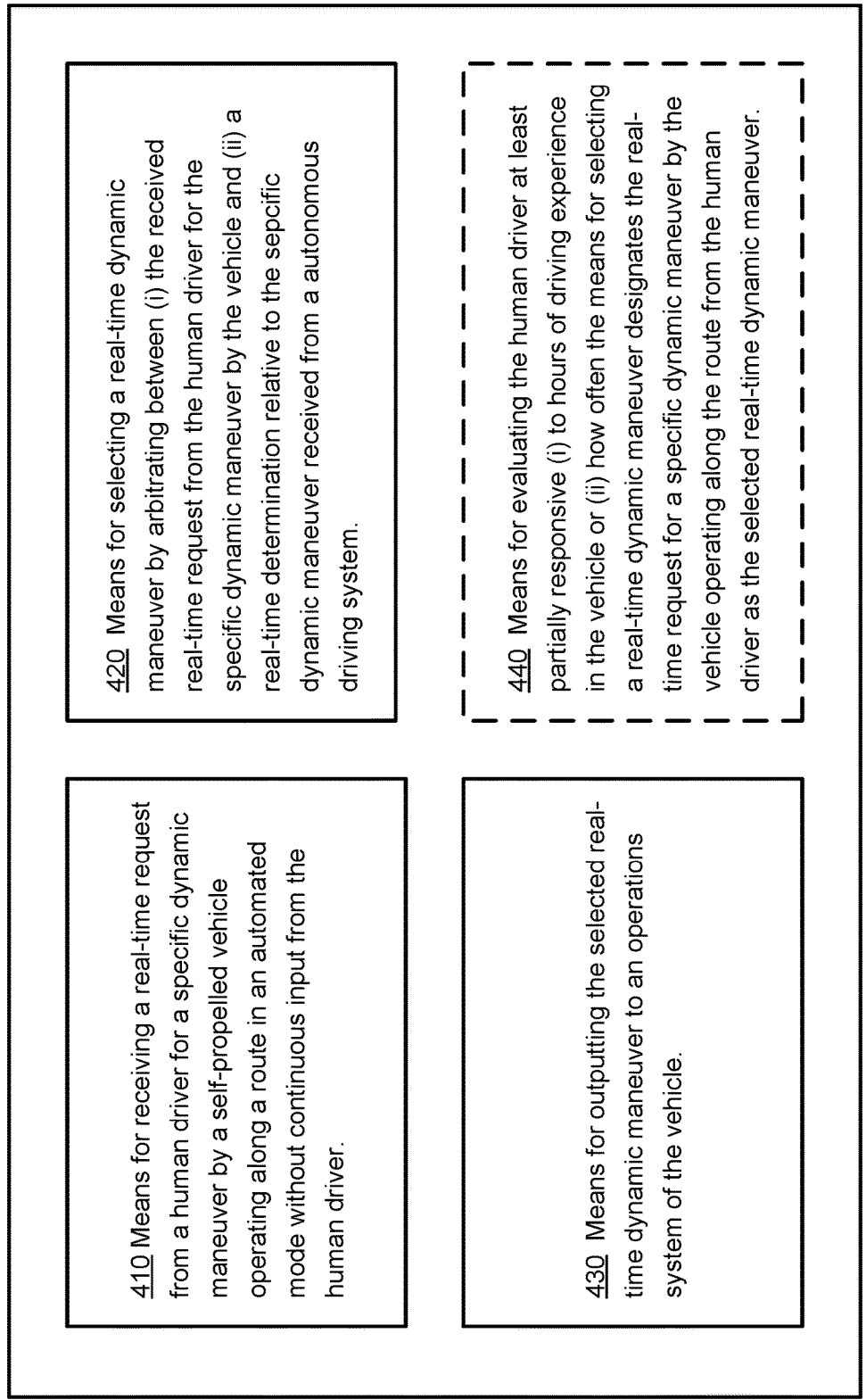

400

410 Means for receiving a real-time request from a human driver for a specific dynamic maneuver by a self-propelled vehicle operating along a route in an automated mode without continuous input from the human driver.

420 Means for selecting a real-time dynamic maneuver by arbitrating between (i) the received real-time request from the human driver for the specific dynamic maneuver by the vehicle and (ii) a real-time determination relative to the sepcific dynamic maneuver received from a autonomous driving system.

430 Means for outputting the selected real-time dynamic maneuver to an operations system of the vehicle.

440 Means for evaluating the human driver at least partially responsive (i) to hours of driving experience in the vehicle or (ii) how often the means for selecting a real-time dynamic maneuver designates the real-time request for a specific dynamic maneuver by the vehicle operating along the route from the human driver as the selected real-time dynamic maneuver.

DRIVER TRAINING IN AN AUTONOMOUS VEHICLE

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

None
If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

For example and without limitation, an embodiment of the subject matter described herein includes a self-propelled vehicle. The vehicle includes a driver training system. The driver training system includes an autonomous driving system configured to dynamically determine maneuvers operating the vehicle along a route in an automated mode without continuous input from a human driver. The driver training system includes an input device configured to receive a real-time request for a specific dynamic maneuver by the vehicle operating along the route from the human driver. The driver training system includes a decision circuit configured to select a real-time dynamic maneuver by arbitrating between (i) the received real-time request for the specific dynamic maneuver from the human driver and (ii) a real-time determination relative to the specific dynamic maneuver received from the autonomous driving system. The driver training system includes an implementation circuit configured to output the selected real-time dynamic maneuver to an operations system of the vehicle.

In an embodiment, the driver training system includes a human interface configured to output human perceivable information indicative of the selected real-time dynamic maneuver to the human driver. In an embodiment, the driver training system includes a communication circuit configured to transmit data to a selected receiver indicative of at least one received real-time request for a specific dynamic maneuver from the human driver and a corresponding selected real-time dynamic maneuvering by the decision circuit. In an embodiment, the driver training system includes another input device configured to receive data indicative of a driving experience level of the human driver. In an embodiment, the driver training system includes a non-transitory tangible computer-readable storage medium configured to store data indicative of a driving experience level of the human driver. In an embodiment, the driver training system includes a driver grading circuit configured to evaluate a driving skill level of the human driver at least partially responsive (i) hours of driving experience in the vehicle or (ii) how often the decision circuit designates the real-time request for a specific dynamic maneuver by the vehicle operating along the route from the human driver as the selected real-time dynamic maneuver. In an embodiment, the driver training system includes a non-transitory tangible computer-readable storage medium configured to store an evaluation assigned to at least one human driver of the vehicle. In an embodiment, the driver training system includes an external interface configured to output to nearby vehicles or pedestrians a human perceivable information indicating the vehicle is in a driver training mode.

For example, and without limitation, an embodiment of the subject matter described herein includes a driver training system. The driver training system includes an autonomous driving system configured to dynamically determine maneuvers operating a self-propelled vehicle along a route in an automated mode without continuous input from a human driver. The driver training system includes an input device configured to receive a real-time request from the human driver for a specific dynamic maneuver by the self-propelled vehicle operating along the route. The driver training system includes a decision circuit configured to select a real-time dynamic maneuver by arbitrating between (i) the received real-time request from the human driver for the specific dynamic maneuver by the vehicle and (ii) a real-time determination relative to the specific dynamic maneuver received from the autonomous driving system. The driver training system an implementation circuit configured to output the selected real-time dynamic maneuver to an operations system of the vehicle.

For example, and without limitation, an embodiment of the subject matter described herein includes a method. The method includes receiving a real-time request from a human driver for a specific dynamic maneuver by a self-propelled vehicle operating along a route in an automated mode without continuous input from the human driver. The method includes selecting a real-time dynamic maneuver by arbitrating between (i) the received real-time request from the human driver for the specific dynamic maneuver by the vehicle and (ii) a real-time determination relative to the specific dynamic maneuver received from an autonomous driving system. The method includes outputting the selected real-time dynamic maneuver to an operations system of the vehicle. In an embodiment, the method includes evaluating the human driver at least partially responsive (i) hours of driving experience in the vehicle or (ii) how often the decision circuit designates the real-time request for a specific dynamic maneuver by the vehicle operating along the route from the human driver as the selected real-time dynamic maneuver.

For example, and without limitation, an embodiment of the subject matter described herein includes system. The system includes means for receiving a real-time request from a human driver for a specific dynamic maneuver by a self-propelled vehicle operating along a route in an automated mode without continuous input from the human driver. The system includes means for selecting a real-time dynamic maneuver by arbitrating between (i) the received real-time request from the human driver for the specific dynamic maneuver by the vehicle and (ii) a real-time determination relative to the specific dynamic maneuver received from the autonomous driving system. The system includes means for outputting the selected real-time dynamic maneuver to an operational system of the vehicle. In an embodiment, the system includes means for evaluating the human driver at least partially responsive (i) hours of driving experience in the vehicle or (ii) how often the means for selecting a real-time dynamic maneuver designates the real-time request for a specific dynamic maneuver by the vehicle operating along the route from the human driver as the selected real-time dynamic maneuver.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 illustrates an environment that includes a self-propelled vehicle;

FIG. 4 illustrates an example operational flow; and

FIG. 5 illustrates an example system.

DETAILED DESCRIPTION

Figure 1:
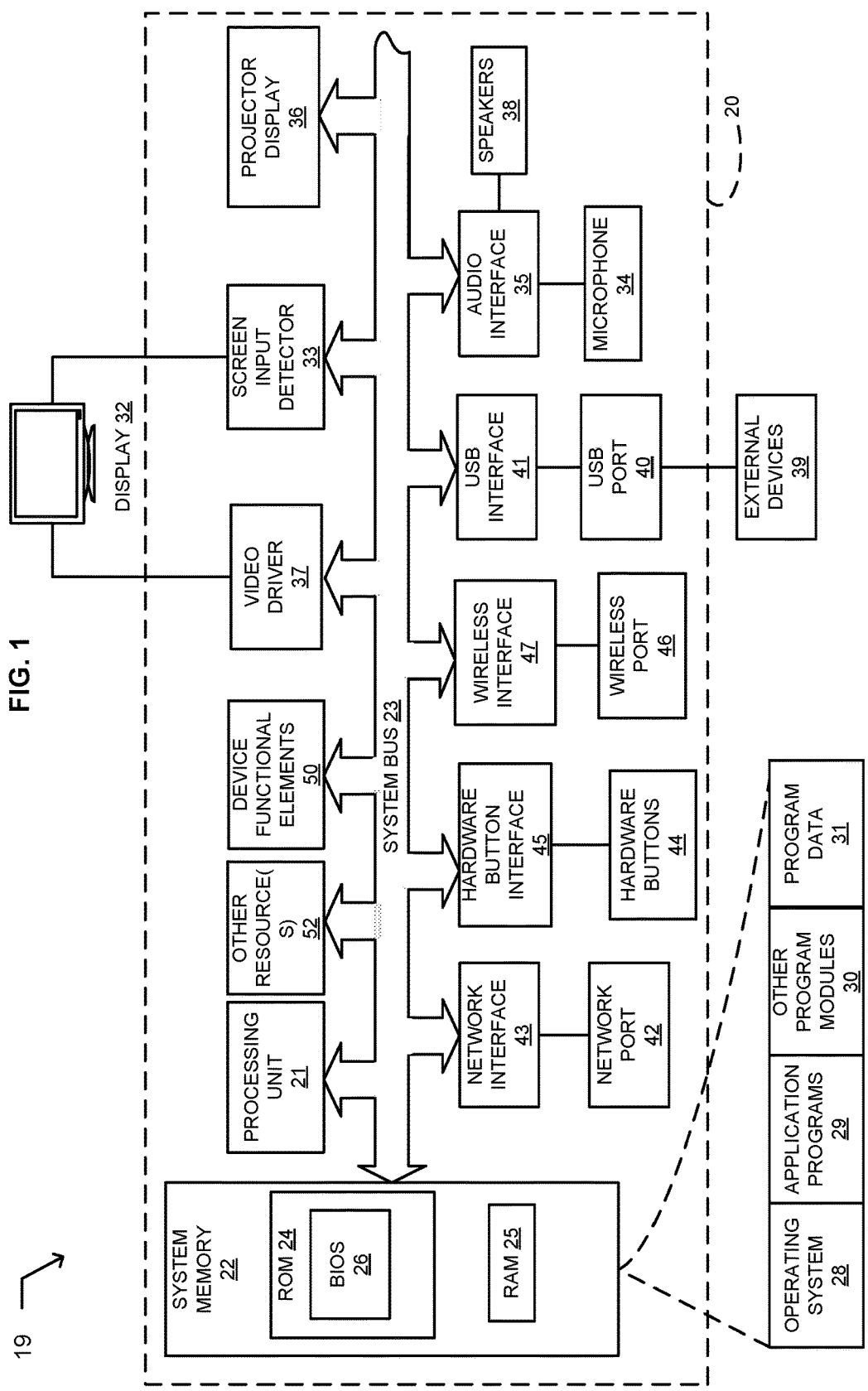
FIG. 1 illustrates an example embodiment of an environment that includes a thin computing device in which embodiments may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various implementations by which processes and/or systems and/or other technologies described herein can be effected (e.g., hardware, software, and/or firmware), and that the preferred implementation will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "circuitry" or "electrical circuitry." Consequently, as used herein "circuitry" and "electrical circuitry" both include, but are not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will likewise recognize that at least some of the devices and/or processes described herein can be integrated into a data processing system. Those having skill in the art will recognize that a data processing system generally includes one or more of a system unit housing, a video display device, memory such as non-volatile memory, processors such as microprocessors or digital signal processors, computational entities such as operating systems, drivers, graphical user interfaces, and applications programs, one or more interaction devices (e.g., a touch pad, a touch-sensitive screen or display surface, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Figure 2:
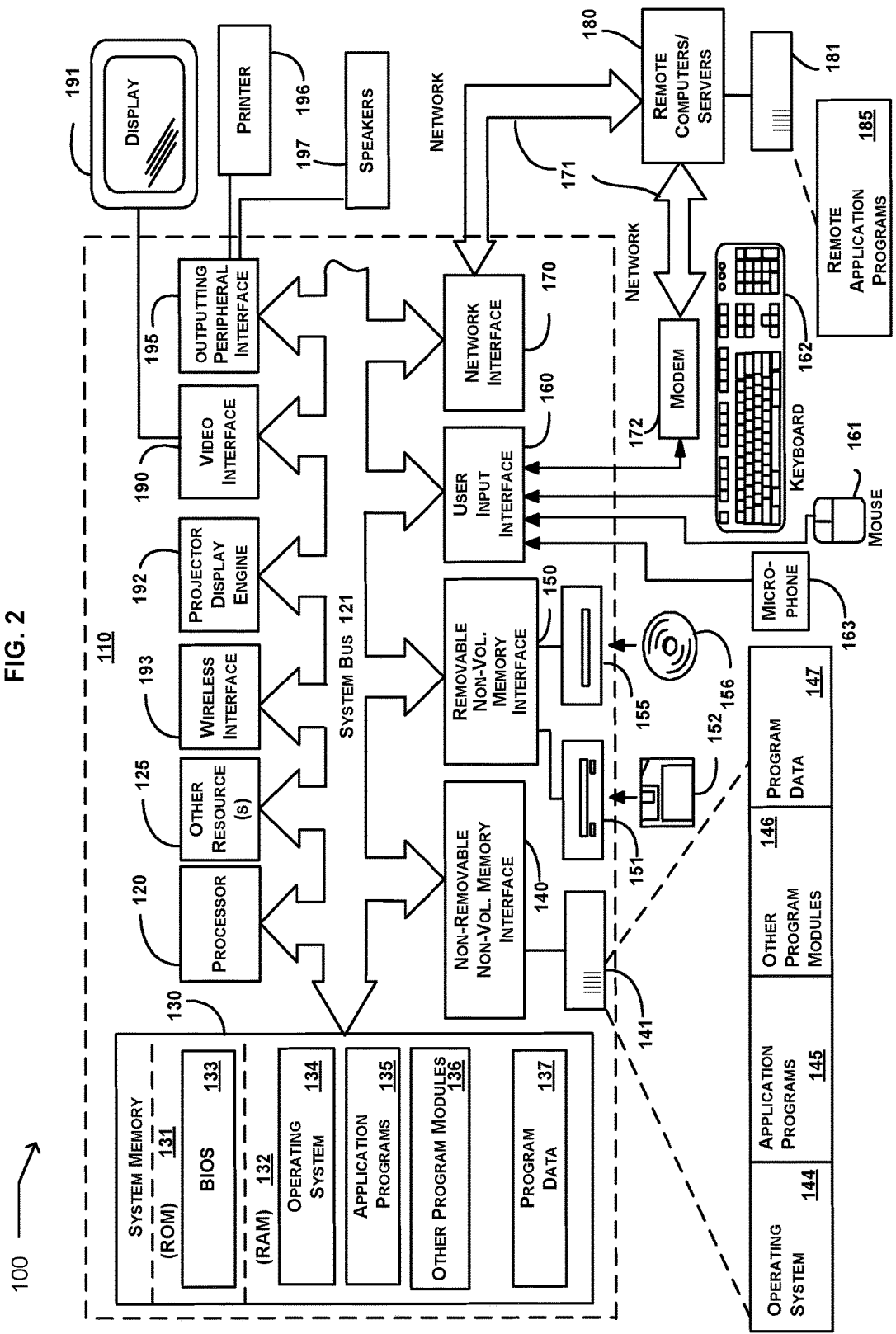
FIG. 2 illustrates an example embodiment of an environment that includes a general purpose computing device.

FIGS. 1 and 2 provide respective general descriptions of several environments in which implementations may be implemented. FIG. 1 is generally directed toward a thin computing environment 19 having a thin computing device 20, and FIG. 2 is generally directed toward a general purpose computing environment 100 having general purpose computing device 110. However, as prices of computer components drop and as capacity and speeds increase, there is not always a bright line between a thin computing device and a general purpose computing device. Further, there is a continuous stream of new ideas and applications for environments benefited by use of computing power. As a result, nothing should be construed to limit disclosed subject matter herein to a specific computing environment unless limited by express language.

FIG. 1 and the following discussion are intended to provide a brief, general description of a thin computing environment 19 in which embodiments may be implemented. FIG. 1 illustrates an example system that includes a thin computing device 20, which may be included or embedded in an electronic device that also includes a device functional element 50. For example, the electronic device may include any item having electrical or electronic components playing a role in a functionality of the item, such as for example, a refrigerator, a car, a digital image acquisition device, a camera, a cable modem, a printer an ultrasound device, an x-ray machine, a non-invasive imaging device, or an airplane. For example, the electronic device may include any item that interfaces with or controls a functional element of the item. In another example, the thin computing device may be included in an implantable medical apparatus or device. In a further example, the thin computing device may be operable to communicate with an implantable or implanted medical apparatus. For example, a thin computing device may include a computing device having limited resources or limited processing capability, such as a limited resource computing device, a wireless communication device, a mobile wireless communication device, a smart phone, an electronic pen, a handheld electronic writing device, a scanner, a cell phone, a smart phone (such as an Android® or iPhone® based device), a tablet device (such as an iPad®) or a Blackberry® device. For example, a thin computing device may include a thin client device or a mobile thin client device, such as a smart phone, tablet, notebook, or desktop hardware configured to function in a virtualized environment.

The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 or RAM 25, including an operating system 28, one or more application programs 29, other program modules 30 and program data 31.

A user may enter commands and information into the computing device 20 through one or more input interfaces. An input interface may include a touch-sensitive screen or display surface, or one or more switches or buttons with suitable input detection circuitry. A touch-sensitive screen or display surface is illustrated as a touch-sensitive display 32 and screen input detector 33. One or more switches or buttons are illustrated as hardware buttons 44 connected to the system via a hardware button interface 45. The output circuitry of the touch-sensitive display 32 is connected to the system bus 23 via a video driver 37. Other input devices may include a microphone 34 connected through a suitable audio interface 35, or a physical hardware keyboard (not shown). Output devices may include the display 32, or a projector display 36.

In addition to the display 32, the computing device 20 may include other peripheral output devices, such as at least one speaker 38. Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). The computing device may include other resource(s) 52. It will be appreciated that the various components and connections shown are examples and other components and means of establishing communication links may be used.

The computing device 20 may be primarily designed to include a user interface. The user interface may include a character, a key-based, or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, a camera capturing and saving an image, or communicating with an implantable medical apparatus.

In certain instances, one or more elements of the thin computing device 20 may be deemed not necessary and omitted. In other instances, one or more other elements may be deemed necessary and added to the thin computing device.

FIG. 2 and the following discussion are intended to provide a brief, general description of an environment in which embodiments may be implemented. FIG. 2 illustrates an example embodiment of a general-purpose computing system in which embodiments may be implemented, shown as a computing system environment 100. Components of the computing system environment 100 may include, but are not limited to, a general purpose computing device 110 having a processor 120, a system memory 130, and a system bus 121 that couples various system components including the system memory to the processor 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any nonvolatile media that can be accessed by the computing device 110, and may include removable or non-removable nonvolatile media. By way of example, and not of limitation, computer-readable media may include computer storage media.

Computer storage media includes removable and non-removable nonvolatile media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media. Computer storage media is a non-transitory computer-readable media.

The system memory 130 includes computer storage media in the form of nonvolatile memory such as ROM 131 and RAM 132. A RAM may include at least one of a DRAM, an EDO DRAM, a SDRAM, a RDRAM, a VRAM, or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by the processor 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS"® are well known in the art.

The computing device 110 may also include other removable/non-removable, nonvolatile computer readable storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, or is coupled to an optical disk drive 155 that reads from and writes to a removable, non-volatile optical disk 156, such as a CD ROM. Other removable/non-removable, non-volatile computer storage media that can be used in the example operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150. The computing device may include other resource(s) 125.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computing device 110 through input devices such as a microphone 163, keyboard 162, and pointing device 161, commonly referred to as a mouse, trackball, or touch pad. Other input devices (not shown) may include at least one of a touch-sensitive screen or display surface, joystick, game pad, satellite dish, and scanner. These and other input devices are often connected to the processor 120 through a user input interface 160 that is coupled to the system bus, but may be connected by other interface and bus structures, such as a parallel port, game port, or a universal serial bus (USB).

A display 191, such as a monitor or other type of display device or surface may be connected to the system bus 121 via an interface, such as a video interface 190. A projector display engine 192 that includes a projecting element may be coupled to the system bus. In addition to the display, the computing device 110 may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, or the wireless interface 193. The network may include a LAN network environment, or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on memory storage device 181. It will be appreciated that the network connections shown are examples and other means of establishing a communication link between the computers may be used.

In certain instances, one or more elements of the computing device 110 may be deemed not necessary and omitted. In other instances, one or more other elements may be deemed necessary and added to the computing device.

FIG. 3 illustrates an environment 200 that includes a self-propelled vehicle 203. In an embodiment, the vehicle may include a self-propelled passenger carrying vehicle. In an embodiment, the vehicle may include a self-propelled freight carrying vehicle. In an embodiment, the vehicle may include a self-propelled train. In an embodiment, the vehicle may include a self-propelled ship. In an embodiment, the vehicle may include a self-propelled fixed wing or rotary wing aircraft. The vehicle includes a driver training system 205. The driver training system includes an autonomous driving system 210 configured to dynamically determine maneuvers operating the vehicle along a route in an automated mode without continuous input from a human driver 298. In an embodiment, the autonomous driving system is configured to dynamically determine maneuvers operating the vehicle along a road or highway in an automated mode. In an embodiment, the autonomous driving system is configured to dynamically determine maneuvers operating the vehicle along a road or highway in a driverless or robotic mode. In an embodiment, the autonomous driving system is configured to dynamically determine maneuvers operating the vehicle along a road or highway in a self-driving mode. The driver training system includes an input device 220 configured to receive a real-time request for a specific dynamic maneuver by the vehicle operating along the route from the human driver. The self-propelled vehicle includes a decision circuit 230 configured to select a real-time dynamic maneuver by arbitrating between (i) the received real-time request for the specific dynamic maneuver from the human driver and (ii) a real-time determination relative to the specific dynamic maneuver received from the autonomous driving system. For example, the decision circuit may arbitrate between (i) a real-time request for the vehicle to maintain 50 mph by the human driver and (ii) a real-time determination that 20 mph is an appropriate speed for a school zone by the autonomous driving system. For example, human driver may make a real-time request for a steering direction, acceleration, or braking maneuver. For example, the request may be inputted using a traditional steering wheel, accelerator pedal, or brake pedal. For example, the autonomous driving system may make a real-time determination that no maneuvers were appropriate at the time. For example, the decision circuit may arbitrate between (i) a real-time request for the vehicle to accelerate by the human driver and (ii) a real-time determination to maintain existing speed or deaccelerate by the autonomous driving system. The driver training system includes an implementation circuit 240 configured to output the selected real-time dynamic maneuver to an operations system 290 of the vehicle. For example, the selected real-time maneuver may include a target speed or an acceleration to be implemented by a throttle controller 296, a steering direction or route selection to be implemented by a steering controller 292, or a braking or speed reduction to be implemented by a braking controller 294. In an embodiment, the implementation circuit may be implemented in whole or in part using a computing device 280.

In an embodiment, the decision circuit 230 is configured to select a real-time dynamic maneuver by arbitrating among (i) the received real-time request for the specific dynamic maneuver by the vehicle 203 from the human driver 298, (ii) a real-time determination relative to the specific dynamic maneuver received from the autonomous driving system 210, and (iii) data indicative of a driving experience level of the human driver. For example, the data indicative of a driving experience level may include time spent driving the vehicle, a history of driving actions with the vehicle, or a history of driving actions with the vehicle and at least one other vehicle. In an embodiment, the data indicative of the driving experience level of the human driver is received from a third party. In an embodiment, the data indicative of the driving experience level of the human driver is received from human driver. In an embodiment, the data indicative of the driving experience level of the human driver is assembled by the decision circuit. In an embodiment, the data indicative of the driving experience level of the human driver includes an evaluation of a driving skill level of the human driver. In an embodiment, decision circuit may employ an artificial intelligence system in implementing its arbitration. In an embodiment, decision circuit may employ a fuzzy system or a genetic fuzzy system in implementing its arbitration.

In an embodiment, the autonomous driving system 210 includes a computerized autonomous driving system. In an embodiment, the autonomous driving system may be implemented in whole or in part using a computing device 280. In an embodiment, the computing device may be substantially similar to the thin computing device 19 described in conjunction with FIG. 1. In an embodiment, the computing device may be substantially similar to the general purpose computing device 110 described in conjunction with FIG. 2. In an embodiment, the autonomous driving system is configured to dynamically determine operational and tactical maneuvers moving the vehicle along the route. In an embodiment, the autonomous driving system is configured to dynamically determine a series of maneuvers moving the vehicle along the route. In an embodiment, the autonomous driving system is configured to dynamically determine a steering, speed, acceleration, or braking maneuver moving the vehicle along the route. In an embodiment, the autonomous driving system is configured to dynamically determine maneuvers moving the vehicle along the route in response to sensor acquired data. For example, the autonomous driving system may be configured to dynamically determine maneuvers moving the vehicle along the route in response to on-board or external sensor acquired data, or data acquired from an external source. In an embodiment, the automated mode of the autonomous driving system includes a conditional automation mode. For example, a conditional automation mode may include driving mode-specific performance of all aspects of the dynamic driving task with the expectation that the human driver will respond appropriately to a request to intervene. SAE International Standard J3016 (2014). In an embodiment, the automated mode includes a high automation mode. For example, a high automation mode may include driving mode-specific performance of all aspects of the dynamic driving task, even if a human driver does not respond appropriately to a request to intervene. In an embodiment, the automated mode includes a full automation mode. For example, a full automation mode may include the full-time performance of all aspects of the dynamic driving task under all roadway and environmental conditions that can be managed by a human driver.

In an embodiment, the input device 220 is configured to receive a real-time request for a specific steering direction by the vehicle 203 operating along the route from the human driver 298. For example, the specific steering direction may be inputted by a steering wheel or a joy stick. In an embodiment, the input device is configured to receive a real-time request for a specific speed by the vehicle operating along the route from the human driver. For example, real-time request for a specific speed may be inputted by a voice command, verbal recognition, knob, or button. In an embodiment, the input device is configured to receive a real-time request for a specific acceleration by the vehicle operating along the route from the human driver. For example, the specific acceleration may be inputted by a driver-activated "gas" pedal. In an embodiment, the input device is configured to receive a real-time request for a specific braking by the vehicle operating along the route from the human driver. For example, the specific braking may be inputted by a driver-activated brake pedal. In an embodiment, the input device is configured to receive a real-time request for a specific dynamic maneuver by the vehicle operating along the route from the human driver. In an embodiment, the specific dynamic maneuver is indicated by a driver input to an input device of the vehicle. For example, the input device may include a steering wheel, accelerator pedal, or brake pedal. For example, the input device may include recognition of a vocal command or gesture. For example, the input device may include a knob, button, or the like.

In an embodiment, the decision circuit 230 is configured to select a real-time dynamic maneuver based upon an arbitration algorithm responsive to the received real-time request for the specific dynamic maneuver from the human driver 298 and the real-time determination relative to the specific dynamic maneuver by the autonomous driving system 210. In an embodiment, the decision circuit is configured to select a real-time dynamic maneuver based upon an arbitration algorithm that blends the received real-time request for the specific dynamic maneuver from the human driver and the real-time determination relative to the specific dynamic maneuver by the autonomous driving system. In an embodiment, the decision circuit is configured to select a real-time dynamic maneuver based upon an arbitration algorithm that blends the received real-time request for the specific dynamic maneuver from the human driver and the real-time determination relative to the specific dynamic maneuver by the autonomous driving system in response to a weighting factor. For example, a weighting factor may include 70% for the autonomous driving system and 30% for human driver. For example, a weighting factor may include 90% for the autonomous driving system and 10% for human driver if they are a new driver or they are experiencing difficulties. For example, a weighting factor may include 50%/50% for an experienced or accomplished driver. In an embodiment, the weighting factor is further responsive to an experience or skill level of the human driver. For example, in an embodiment, the decision circuit changes its responsiveness to driver's commands based on the driver's experience. For example, the driver's experience may include hours or miles of experience. In an embodiment, the weighting factor is responsive to an error rate of the human driver. For example, in an embodiment, the decision circuit changes its responsiveness to driver's commands based on how much the driver's recent commands agree or disagree with the decision circuit. In an embodiment, the weighting factor is further responsive to a determined quality of at least two previous real-time requests for specific dynamic maneuvers of the vehicle from the human driver. For example, the weighting or blending can depend on the quality of the driver's commands, e.g., how close his commands are to the autonomous driving system's determinations. For example, the decision circuit may use more of driver's command if it is close to the car's one than if it's not.

In an embodiment, the decision circuit 230 is configured to default to the real-time determination relative to the specific dynamic maneuver received from the autonomous driving system if the received real-time request for the specific dynamic maneuver from the human driver deviates by a predetermined factor from the real-time determination relative to the specific dynamic maneuver by the autonomous driving system. For example, if the predetermined factor is 20%, and if the autonomous driving system determines a speed of 35 mph, the arbitration algorithm will ignore any driver request for a speed more than 42 mph or less than 28 mph, and output 35 mph as the specific real-time dynamic maneuver. In an embodiment, the decision circuit is configured to select a real-time dynamic maneuver based upon an arbitration algorithm that probabilistically selects the received real-time request for the specific dynamic maneuver from the human driver or the real-time determination relative to the specific dynamic maneuver by the autonomous driving system in response to a probability factor. For example, the decision may select the received real-time request for the specific dynamic maneuver from the human driver 30% of the time and the specific dynamic maneuver by the autonomous driving system 70% of the time. In an embodiment, the probability factor may be adjusted based on the driver's experience; for example, with the requests from a more experienced driver being assigned a larger probability factor than requests from a less experienced driver.

In an embodiment, the decision circuit 230 is configured to select a real-time dynamic maneuver by arbitrating among (i) a received real-time request for the specific dynamic maneuver from the human driver, (ii) a real-time determination relative to the specific dynamic maneuver received from the autonomous driving system, and (iii) data indicative of traffic or road conditions ahead. For example, the decision circuit may select no left turn now, but an opportunity is expected to allow a safe left turn in 20 secs, or 500 meters ahead. For example, the decision circuit may consider approaching hills, curves, weather conditions, lighting, and visibility. In an embodiment, the decision circuit is configured to select a real-time dynamic maneuver by arbitrating among a (i) received real-time request for the specific dynamic maneuver from the human driver, (ii) a real-time determination relative to the specific dynamic maneuver received from the autonomous driving system, (iii) data indicative of traffic or road conditions ahead, and (iv) a determined skill level of the human driver. For example, the decision circuit may control where the driver is allowed to drive based on their experience. For example, they can initially be restricted from freeways, steep hills, etc. In an embodiment, the decision circuit decision circuit is configured to default to the real-time determination relative to the specific dynamic maneuver received from the autonomous driving system if real-time traffic or road conditions are not suitable for a determined skill level of the human driver. In an embodiment, the decision circuit decision circuit is configured to select a real-time dynamic maneuver by arbitrating among (i) a received real-time request for the specific dynamic maneuver from the human driver, (ii) a real-time determination relative to the specific dynamic maneuver received from the autonomous driving system, and (iii) a classification of the specific dynamic maneuver. For example, in an embodiment, responsiveness to the human driver may be different for different types of commands. For example, in an embodiment, the decision circuit is more willing to accept the driver's input of speeding up than on lane changes. For example, in an embodiment, the decision circuit adjusts its responsiveness to driver's steering commands only based on quality of his previous steering commands, not on their previous braking commands. For example, in an embodiment, responsiveness settings can be adjusted by human driver or third party, such as to concentrate training on certain types of commands. In an embodiment, the decision circuit may be implemented in whole or in part using the computing device 280.

In an embodiment, the driver training system 205 includes a human interface 250 configured to output human perceivable information indicative of the selected real-time dynamic maneuver to the human driver 298. For example, the human interface may include a display, screen, audio, haptic, or lights. In an embodiment, the interface is further configured to output to the human driver a reason, explanation, or rationale for the decision circuit's rejection or modification of the real-time request by the human driver for the specific dynamic maneuver. In an embodiment, the interface is further configured to output a suggested acceptable real-time request for the particular dynamic maneuver to the human driver. In an embodiment, the interface is further configured to output to the human driver a reason, explanation, or rationale for the decision circuit's selection of the real-time determination relative to the specific dynamic maneuver received from the autonomous driving system.

In an embodiment, the driver training system 205 includes a communication circuit 260 configured to transmit data to a selected receiver indicative of at least one received real-time request for a specific dynamic maneuver from the human driver 298 and a corresponding selected real-time dynamic maneuvering by the decision circuit 230. In an embodiment, the selected receiver may be the human driver, a third-party, a parent, a spouse, insurance company, or governmental entity. In an embodiment, the communication circuit may be a wireless 262 communication circuit.

In an embodiment, the driver training system 205 includes another input device configured to receive data indicative of a driving experience level of the human driver 298. For example, the another input device may read from the human driver's key or from a key fob, or receive an input from the human driver in the form of a code. For example, the another input device may wirelessly receive the data from an external database. In an embodiment, the decision circuit 230 is configured to select a real-time dynamic maneuver by arbitrating among (i) the received real-time request for the specific dynamic maneuver by the vehicle from the human driver, (ii) a real-time determination relative to the specific dynamic maneuver received from the autonomous driving system 210, and (iii) the data indicative of the driving experience level of the human driver.

In an embodiment, the driver training system 205 includes a non-transitory tangible computer-readable storage medium 282 configured to store data indicative of a driving experience level of the human driver 298. For example, the data may be read from the driver's key, an input from the driver, or a code. For example, the data may be received wirelessly from an external database. For example, the driver training system may remember the human driver's previous performance in the vehicle. For example, the driver training system may write data from the human driver's current performance into the computer-readable storage medium for subsequent use.

In an embodiment, the driver training system 205 includes a driver grading circuit 270 configured to evaluate a driving skill level of the human driver at least partially responsive (i) hours of driving experience in the vehicle or (ii) how often the decision circuit designates the real-time request for a specific dynamic maneuver by the vehicle operating along the route from the human driver as the selected real-time dynamic maneuver. In an embodiment, the driver grading circuit is configured to evaluate a driving skill level of the human driver at least partially responsive (i) hours of driving experience in the vehicle, (ii) degree of correlation between the real-time request for a particular dynamic maneuver by the vehicle operating along the route from the human driver with the real-time determination relative to the particular dynamic maneuver by the autonomous driving system, or (iii) how often the decision circuit designates the real-time request for a specific dynamic maneuver by the vehicle operating along the route from the human driver as the selected real-time dynamic maneuver. In an embodiment, the decision circuit 230 is configured to select a real-time dynamic maneuver by arbitrating among (i) the received real-time request for the specific dynamic maneuver by the vehicle from the human driver, (ii) a real-time determination relative to the specific dynamic maneuver received from the autonomous driving system, and (iii) the evaluation of the driving skill level of the human driver.

In an embodiment, the driver training system 205 includes the non-transitory tangible computer-readable storage medium 282 configured to store an evaluation assigned to at least one human driver 298 of the vehicle. For example, the evaluation may be at least partially responsive (i) hours of driving experience in the vehicle or (ii) how often the decision circuit designates the real-time request for a specific dynamic maneuver by the vehicle operating along the route from the human driver as the selected real-time dynamic maneuver. In an embodiment, the driver training system includes an external interface 296 configured to output to nearby vehicles or pedestrians human perceivable information indicating the vehicle is in a driver training mode. For example, the human perceivable information may be outputted by an electronic display or audibly. In an embodiment, the vehicle includes vehicle includes a car, truck, motorcycle, recreational vehicle, boat, ship, airplane, helicopter, or train.

FIG. 3 also illustrates an embodiment of the driver training system 205. The driver training system includes the autonomous driving system 210 configured to dynamically determine maneuvers operating the self-propelled vehicle 203 along a route in an automated mode without continuous input from the human driver 298. The driver training system includes the input device 220 configured to receive a real-time request from the human driver for a specific dynamic maneuver by the self-propelled vehicle operating along the route. The driver training system includes a decision circuit 230 configured to select a real-time dynamic maneuver by arbitrating between (i) the received real-time request from the human driver for the specific dynamic maneuver by the vehicle and (ii) a real-time determination relative to the specific dynamic maneuver received from the autonomous driving system. The driver training system includes an implementation circuit 240 configured to output the selected real-time dynamic maneuver to the operations system 290 of the vehicle.

In an embodiment of the driver training system 205, the decision circuit 230 is configured to select a real-time dynamic maneuver by arbitrating among (i) the received real-time request for the specific dynamic maneuver by the vehicle from the human driver, (ii) a real-time determination relative to the specific dynamic maneuver received from the autonomous driving system, and (iii) data indicative of a driving experience level of the human driver 298.

FIG. 4 illustrates an example operational flow 300. After a start operation, the operational flow includes a reception operation 310. The reception operation includes receiving a real-time request from a human driver for a specific dynamic maneuver by a self-propelled vehicle operating along a route in an automated mode without continuous input from the human driver. In an embodiment, the reception operation may be implemented using the input device 220 described in conjunction with FIG. 3. A decision operation 320 includes selecting a real-time dynamic maneuver by arbitrating between (i) the received real-time request from the human driver for the specific dynamic maneuver by the vehicle and (ii) a real-time determination relative to the specific dynamic maneuver received from an autonomous driving system. In an embodiment, the decision operation may be implemented using the decision circuit 230 described in conjunction with FIG. 3. An implementation operation 330 includes outputting the selected real-time dynamic maneuver to an operations system of the vehicle. In an embodiment, the implementation operation may be implemented using the implementation circuit 240 described in conjunction with FIG. 3. The operational flow includes an end operation.

In an embodiment of the decision operation 320, the selecting includes selecting a real-time dynamic maneuver by arbitrating among (i) the received real-time request for the specific dynamic maneuver by the vehicle from the human driver, (ii) a real-time determination relative to the specific dynamic maneuver received from the autonomous driving system, and (iii) data indicative of a driving experience level of the human driver. In an embodiment, the operational flow 300 includes evaluating the human driver at least partially responsive (i) hours of driving experience in the vehicle or (ii) how often the decision circuit designates the real-time request for a specific dynamic maneuver by the vehicle operating along the route from the human driver as the selected real-time dynamic maneuver. In an embodiment, the decision operation includes selecting real-time dynamic maneuver by arbitrating between (i) the received real-time request for the specific dynamic maneuver by the vehicle from the human driver, (ii) a real-time determination relative to the specific dynamic maneuver received from the autonomous driving system, and (iii) the evaluation assigned to the human driver.

FIG. 5 illustrates an example system 400. The system includes means 410 for receiving a real-time request from a human driver for a specific dynamic maneuver by a self-propelled vehicle operating along a route in an automated mode without continuous input from the human driver. The system includes means 420 for selecting a real-time dynamic maneuver by arbitrating between (i) the received real-time request from the human driver for the specific dynamic maneuver by the vehicle and (ii) a real-time determination relative to the specific dynamic maneuver received from the autonomous driving system. The system includes means 430 for outputting the selected real-time dynamic maneuver to an implementation means of the vehicle.

In an embodiment, the means 420 for selecting includes means for selecting a real-time dynamic maneuver by arbitrating among (i) the received real-time request for the specific dynamic maneuver by the vehicle from the human driver, (ii) a real-time determination relative to the specific dynamic maneuver received from the autonomous driving system, and (iii) data indicative of a driving experience level of the human driver. In an embodiment, the system includes means 440 for evaluating the human driver at least partially responsive (i) to hours of driving experience in the vehicle or (ii) how often the means for selecting a real-time dynamic maneuver designates the real-time request for a specific dynamic maneuver by the vehicle operating along the route from the human driver as the selected real-time dynamic maneuver.

All references cited herein are hereby incorporated by reference in their entirety or to the extent their subject matter is not otherwise inconsistent herewith.

In some embodiments, "configured" or "configured to" includes at least one of designed, set up, shaped, implemented, constructed, or adapted for at least one of a particular purpose, application, or function. In some embodiments, "configured" or "configured to" includes positioned, oriented, or structured for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as A1, A2, and C together, A, B¬1, B2, C1, and C2 together, or B1 and B2 together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A self-propelled vehicle comprising:
an autonomous driving system configured to dynamically determine maneuvers operating the vehicle along a route in an automated mode without continuous input from a human driver;
an input device configured to receive a real-time request from the human driver for a specific dynamic maneuver by the vehicle operating along the route;
a decision circuit configured to select a real-time dynamic maneuver by arbitrating one of:
between (i) the received real-time request for the specific dynamic maneuver from the human driver and (ii) a real-time determination relative to the specific dynamic maneuver received from the autonomous driving system, wherein the decision circuit is configured to default to the real-time determination relative to the specific dynamic maneuver received from the autonomous driving system if the received real-time request for the specific dynamic maneuver from the human driver deviates by a predetermined factor from the real-time determination relative to the specific dynamic maneuver by the autonomous driving system; and
between (i) the received real-time request for the specific dynamic maneuver by the vehicle from the human driver, (ii) the real-time determination relative to the specific dynamic maneuver received from the autonomous driving system, and (iii) an evaluation of the driving skill level of the human driver generated by a driver grading circuit configured to evaluate a driving skill level of the human driver at least partially responsive to (i) hours of driving experience in the vehicle based on data indicative of a driving experience level of the human driver received from another input device or (ii) how often the decision circuit selected the real-time request for a specific dynamic maneuver from the human driver as the selected real-time dynamic maneuver; and
an implementation circuit configured to output the selected real-time dynamic maneuver to an operations system of the vehicle.

2. The vehicle of claim 1, wherein the autonomous driving system is configured to dynamically determine a steering, speed, acceleration, or braking maneuver moving the vehicle along the route.

3. The vehicle of claim 1, wherein the autonomous driving system is configured to dynamically determine maneuvers moving the vehicle along the route in response to sensor acquired data.

4. The vehicle of claim 1, wherein the automated mode includes a conditional automation mode.

5. The vehicle of claim 1, wherein the automated mode includes a high automation mode.

6. The vehicle of claim 1, wherein the automated mode includes a full automation mode.

7. The vehicle of claim 1, wherein the input device is configured to receive a real-time request for a specific steering direction by the vehicle operating along the route from the human driver.

8. The vehicle of claim 1, wherein the input device is configured to receive a real-time request for a specific speed by the vehicle operating along the route from the human driver.

9. The vehicle of claim 1, wherein the input device is configured to receive a real-time request for a specific acceleration by the vehicle operating along the route from the human driver.

10. The vehicle of claim 1, wherein the input device is configured to receive a real-time request for a specific braking by the vehicle operating along the route from the human driver.

11. The vehicle of claim 1, wherein the decision circuit is configured to select a real-time dynamic maneuver based upon an arbitration algorithm responsive to the received real-time request for the specific dynamic maneuver from the human driver and the real-time determination relative to the specific dynamic maneuver received from the autonomous driving system.

12. The vehicle of claim 1, wherein the decision circuit is configured to select a real-time dynamic maneuver based upon an arbitration algorithm that blends the received real-time request for the specific dynamic maneuver from the human driver and the real-time determination relative to the specific dynamic maneuver by the autonomous driving system.

13. The vehicle of claim 1, wherein the decision circuit is configured to select a real-time dynamic maneuver based upon an arbitration algorithm that selects the received real-time request for the specific dynamic maneuver from the human driver or the real-time determination relative to the specific dynamic maneuver by the autonomous driving system in response to a probability factor.

14. The vehicle of claim 1, wherein the decision circuit is configured to select a real-time dynamic maneuver by arbitrating among (i) a received real-time request for the specific dynamic maneuver from the human driver, (ii) a real-time determination relative to the specific dynamic maneuver received from the autonomous driving system, and (iii) data indicative of traffic and road conditions ahead.

15. The vehicle of claim 1, wherein the decision circuit is configured to default to the real-time determination relative to the specific dynamic maneuver received from the autonomous driving system if real-time traffic or road conditions are not suitable for a skill level of the human driver.

16. The vehicle of claim 1, further comprising:
a human interface configured to output to the human driver perceivable information indicative of the selected real-time dynamic maneuver.

17. The vehicle of claim 16, wherein the interface is further configured to output to the human driver a reason, explanation, or rationale for the decision circuit's rejection or modification of the real-time request by the human driver for the specific dynamic maneuver.

18. The vehicle of claim 16, wherein the interface is further configured to output to the human driver a reason, explanation, or rationale for the decision circuit's selection of the real-time determination relative to the specific dynamic maneuver received from the autonomous driving system.

19. The vehicle of claim 1, further comprising:
a communication circuit configured to transmit data to a selected receiver indicative of at least one received real-time request for a specific dynamic maneuver from the human driver and a corresponding selected real-time dynamic maneuvering by the decision circuit.

20. The vehicle of claim 1, further comprising:
a non-transitory tangible computer-readable storage medium configured to store data indicative of a driving experience level of the human driver.

21. The vehicle of claim 1, further comprising:
an external interface configured to output to nearby vehicles or pedestrians a human perceivable information indicating the vehicle is in a driver training mode.

22. A driver training system comprising:
an autonomous driving system configured to dynamically determine maneuvers operating a self-propelled vehicle along a route in an automated mode without continuous input from a human driver;
an input device configured to receive a real-time request from the human driver for a specific dynamic maneuver by the self-propelled vehicle operating along the route;
a decision circuit configured to select a real-time dynamic maneuver by arbitrating one of:
between (i) the received real-time request for the specific dynamic maneuver from the human driver and (ii) a real-time determination relative to the specific dynamic maneuver received from the autonomous driving system, wherein the decision circuit is configured to default to the real-time determination relative to the specific dynamic maneuver received from the autonomous driving system if the received real-time request for the specific dynamic maneuver from the human driver deviates by a predetermined factor from the real-time determination relative to the specific dynamic maneuver by the autonomous driving system; and
between (i) the received real-time request for the specific dynamic maneuver by the vehicle from the human driver, (ii) the real-time determination relative to the specific dynamic maneuver received from the autonomous driving system, and (iii) an evaluation of the driving skill level of the human driver generated by a driver grading circuit configured to evaluate a driving skill level of the human driver at least partially responsive to (i) hours of driving experience in the vehicle or (ii) how often the decision circuit selected the real-time request for a specific dynamic maneuver from the human driver as the selected real-time dynamic maneuver; and
an implementation circuit configured to output the selected real-time dynamic maneuver to an operations system of the vehicle.

23. A method comprising:
receiving a real-time request from a human driver for a specific dynamic maneuver by a self-propelled vehicle operating along a route in an automated mode without continuous input from the human driver;
selecting a real-time dynamic maneuver by arbitrating one of:
between (i) the received real-time request from the human driver for the specific dynamic maneuver by the vehicle and (ii) a real-time determination relative to the specific dynamic maneuver received from an autonomous driving system, by defaulting to the real-time determination relative to the specific dynamic maneuver received from the autonomous driving system responsive to the received real-time request for the specific dynamic maneuver from the human driver deviating by a predetermined factor from the real-time determination relative to the specific dynamic maneuver by the autonomous driving system; and
between (i) the received real-time request for the specific dynamic maneuver by the vehicle from the human driver, (ii) the real-time determination relative to the specific dynamic maneuver received from the autonomous driving system, and (iii) an evaluation assigned to the human driver, the evaluation being at least partially responsive to (i) hours of driving experience in the vehicle or (ii) how often a decision circuit designates the real-time request for a specific dynamic maneuver by the vehicle operating along the route from the human driver as the selected real-time dynamic maneuver; and
outputting the selected real-time dynamic maneuver to an operations system of the vehicle.

24. A system comprising:
means for receiving a real-time request from a human driver for a specific dynamic maneuver by a self-propelled vehicle operating along a route in an automated mode without continuous input from the human driver;
means for selecting a real-time dynamic maneuver by arbitrating one of:
between (i) the received real-time request from the human driver for the specific dynamic maneuver by the vehicle and (ii) a real-time determination relative to the specific dynamic maneuver received from an autonomous driving system, defaulting to the real-time determination relative to the specific dynamic maneuver received from the autonomous driving system if the received real-time request for the specific dynamic maneuver from the human driver deviates by a predetermined factor from the real-time determination relative to the specific dynamic maneuver by the autonomous driving system;
between (i) the received real-time request for the specific dynamic maneuver by the vehicle from the human driver, (ii) the real-time determination relative to the specific dynamic maneuver received from the autonomous driving system, and (iii) an evaluation assigned to the human driver, the evaluation being at least partially responsive to (i) hours of driving experience in the vehicle or (ii) how often a decision circuit designates the real-time request for a specific dynamic maneuver by the vehicle operating along the route from the human driver as the selected real-time dynamic maneuver; and
means for outputting the selected real-time dynamic maneuver to an operational system of the vehicle.

* * * * *